(12) United States Patent
Fink et al.

(10) Patent No.: US 10,131,424 B2
(45) Date of Patent: Nov. 20, 2018

(54) COMPOUND ROTORCRAFT

(71) Applicant: AIRBUS HELICOPTERS DEUTSCHLAND GMBH, Donauworth (DE)

(72) Inventors: Axel Fink, Donauworth (DE); Martin Blacha, Donauworth (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 320 days.

(21) Appl. No.: 15/259,219

(22) Filed: Sep. 8, 2016

(65) Prior Publication Data
US 2017/0197709 A1    Jul. 13, 2017

(30) Foreign Application Priority Data

Sep. 11, 2015  (EP) .................................... 15400040

(51) Int. Cl.
*B64C 27/26*        (2006.01)
*B64C 39/06*        (2006.01)
(Continued)

(52) U.S. Cl.
CPC ............... *B64C 27/26* (2013.01); *B64C 1/26* (2013.01); *B64C 3/16* (2013.01); *B64C 3/185* (2013.01);
(Continued)

(58) Field of Classification Search
CPC .. B64C 1/26; B64C 3/16; B64C 25/10; B64C 27/24; B64C 27/26; B64C 39/068
See application file for complete search history.

(56) References Cited

U.S. PATENT DOCUMENTS 1,995,090 A  *  3/1935  Bellanca .................... B64C 3/16
                                                    244/46
2,290,850 A      7/1942  Umschweif
(Continued)

FOREIGN PATENT DOCUMENTS

EP          2418148         2/2012
EP          2690011         1/2014
WO       2008142257        11/2008

OTHER PUBLICATIONS

"Pilots Manual for F4U Corsair." Aviation Publications. 1977. (Year: 1977).*

(Continued)

*Primary Examiner* — Brian M O'Hara
*Assistant Examiner* — Michael B. Kreiner
(74) *Attorney, Agent, or Firm* — Brooks Kushman P.C.

(57) ABSTRACT

A compound rotorcraft with a fuselage and at least one main rotor, the fuselage comprising a lower side and an upper side that is opposed to the lower side, the at least one main rotor being arranged at the upper side, wherein at least one propeller is provided and mounted to a fixed wing arrangement that is laterally attached to the fuselage, the fixed wing arrangement comprising at least one upper wing that is arranged at an upper wing root joint area provided at the upper side of the fuselage and at least one lower wing that is arranged at a lower wing root joint area provided at the lower side of the fuselage, the upper and lower wings being at least interconnected at an associated interconnection region.

11 Claims, 6 Drawing Sheets

(51) Int. Cl.
*B64C 1/26* (2006.01)
*B64C 3/16* (2006.01)
*B64C 3/18* (2006.01)
*B64C 25/10* (2006.01)
*B64C 25/34* (2006.01)
*B64C 27/06* (2006.01)
*B64C 27/24* (2006.01)
*B64C 27/82* (2006.01)

(52) U.S. Cl.
CPC .............. *B64C 25/10* (2013.01); *B64C 25/34* (2013.01); *B64C 27/06* (2013.01); *B64C 27/24* (2013.01); *B64C 27/82* (2013.01); *B64C 39/068* (2013.01); *B64C 2027/8236* (2013.01); *B64C 2027/8263* (2013.01)

(56) References Cited

U.S. PATENT DOCUMENTS

| | | | |
|---|---|---|---|
| 3,981,460 A * | 9/1976 | Ratony | B64C 39/068 244/13 |
| 4,146,199 A | 3/1979 | Wenzel | |
| 4,856,736 A | 8/1989 | Adkins et al. | |
| 5,046,684 A | 9/1991 | Wolkovitch | |
| 6,098,923 A | 8/2000 | Peters, Jr. | |
| 8,186,617 B2 * | 5/2012 | Llamas Sandin | B64C 39/068 244/34 R |
| 8,657,226 B1 | 2/2014 | McGinnis | |
| 2005/0045762 A1 | 3/2005 | Pham | |
| 2009/0321554 A1 | 12/2009 | Roesch | |
| 2013/0175383 A1 | 7/2013 | Cacciaguera | |
| 2013/0175385 A1 | 7/2013 | Eglin | |
| 2014/0061367 A1 * | 3/2014 | Fink | B64C 27/26 244/6 |

OTHER PUBLICATIONS

European Search Report for European Application No. EP 15400040.0, Completed by the European Patent Office dated Jan. 28, 2016, 8 Pages.

* cited by examiner

COMPOUND ROTORCRAFT

CROSS REFERENCE TO RELATED APPLICATION

This application claims priority to European patent application No. EP 15400040.0 filed on Sep. 11, 2015, the disclosure of which is incorporated in its entirety by reference herein.

BACKGROUND OF THE INVENTION (1) Field of the Invention

The invention is related to a compound rotorcraft with a fuselage, at least one main rotor that is at least adapted for generating lift in operation, and a fixed wing arrangement that is laterally attached to the fuselage.

(2) Description of Related Art

Compound rotorcrafts and so-called convertiplanes are basically the most relevant concepts aiming to overcome horizontal flight deficiencies of conventional helicopters, i.e. helicopters with a main rotor and an auxiliary tail rotor that is adapted to counter torque, by introducing attributes of fixed-wing aircrafts to such conventional helicopters as compromise. However, a compromise between both aircraft types has always to be conveniently adapted to a planned mission profile of a given rotorcraft.

An exemplary convertiplane is e.g. described in the document U.S. Pat. No. 5,046,684. More specifically, the latter describes a tiltrotor aircraft with a fuselage and a fixed wing arrangement. On each side of the fuselage a first and a second wing are arranged. The first wing is fixed at substantially the bottom of the fuselage and substantially unperforated in hovering as well as forward flight. The second wing is fixed at substantially the top of the fuselage, or fixed to a structure extending above the fuselage, and is likewise substantially unperforated in hovering as well as forward flight. At least one of the first and second wings has dihedral so that the wings converge to join or nearly join at their tips. Furthermore, unducted rotor means are provided for generating aerodynamic lift sufficient for highly efficient hovering flight and for propelling the tiltrotor aircraft at speeds approaching roughly four hundred knots in forward cruising flight. The unducted rotor means are supported on the first and second wings, at or near the tips of the first and second wings. They can be pivoted for operation in different orientations in hovering and forward flight respectively.

In other words, according to the document U.S. Pat. No. 5,046,684, the tiltrotor aircraft features two fully tiltable rotors, one at each side of the fuselage, and which are respectively arranged at the tips of a joined wing of the fixed wing arrangement. In this fixed wing arrangement, the lower, i.e. first wing is straight and positively swept, and the upper, i.e. second wing is straight and exhibits a very pronounced negative sweep. The upper wing is anhedral and connects the tip of the lower wing of the fixed wing arrangement to the tip of the tiltrotor aircraft's fin.

In contrast to such a tiltrotor aircraft, winged compound rotorcraft configurations with separate propulsion units typically feature a monoplane design with one set of wing surfaces in cantilever design as shoulder-wing arrangement. A compound rotorcraft with lift compounding, thrust compounding or a combination of both basically aims to off-load a respective main rotor from its simultaneous lifting and propulsive duties to allow for higher forward speeds of the compound rotorcraft.

More specifically, lift compounding entails adding wings to a rotorcraft, hence enabling to increase an underlying load factor of the rotorcraft and to reach a higher maneuverability. This improves the efficiency of the rotorcraft at moderately high speed but at the expense of reduced efficiencies at lower forward speeds and in the hover.

Thrust compounding implies the addition of essentially horizontally oriented auxiliary propulsion units to the rotorcraft. This has been typically accomplished by means of a single or a pair of propellers being driven by drive shafts powered by main turboshaft engines of the rotorcraft. The use of a pair of propulsion units has the advantage of providing for anti-torque capabilities without the need of an additional tail rotor, hence relativizing the inherent system complexity of the thrust compound configuration.

A more extended configuration of a compound rotorcraft includes both the addition of wings and propulsion units. In this case, lift during cruise is simultaneously provided by a given main rotor—in powered condition—usually addressed as "hybrid helicopter"—or in autorotation—"autogyro"—modus—and the wings. Higher forward speed is provided by horizontally oriented auxiliary propulsion units of the compound rotorcraft. The compound rotorcraft hence overcomes underlying rotor lift limits by means of the wings and underlying rotor thrust limits by means of the propulsion units. As a result, a higher load factor is obtained along with potential for higher speed. In particular, use of a pair of thrust propulsion units—opposed and both offset relative to each other and to a longitudinal axis of the compound rotorcraft—enables for a simultaneous torque correction.

Exemplary compound rotorcrafts with two wing-mounted propellers defining the above-described propulsion units are described in the documents EP 2146896, EP 2690011 and US 2013/0175385. These exemplary compound rotorcrafts are all provided with fixed wing arrangements, as described hereinafter.

The document EP 2146896 describes a compound rotorcraft with a fixed wing arrangement in the form of a cantilevered wing configuration that comprises pusher propellers that are installed at tips of straight and plane cantilevered wings with associated drive shafts that are respectively housed within the wings. Corresponding housings of the propeller drive shafts that are arranged inside the wings require an underlying wing planform to be straight. Furthermore, the cantilevered wing configuration requires a large wing root thickness and a continuation of wing bending capabilities throughout an upper fuselage deck. In general, such a cantilevered wing configuration comprises straight wings, wherein each of the wings has a constant sweep and constant anhedral.

The document EP 2690011 describes a compound rotorcraft with a fixed wing arrangement in the form of a joined-wing configuration, wherein a lower wing and an upper wing are provided on each side of the compound rotorcraft. Both wings are essentially straight and interconnected to each other at a wing interconnection region, and a pusher propeller is installed in the interconnection region behind associated trailing edges of both wings. This joined-wing configuration especially outstands by its improved mechanical efficiency in terms of less structural weight and larger stiffness, as well as by improved inherent operational safety characteristics and improved system integration, especially referring to an underlying accessibility of a main gear box of the compound rotorcraft.

The document EP 2418148 describes an airliner aircraft having a lambda-box wing configuration. The aircraft comprises a fuselage, a propulsion system with turbojets, a first pair of swept-back airfoils, connected to the top forward portion of the fuselage. A second pair of swept-forward airfoils is connected to the lower rear portion of the fuselage at a point of the fuselage aft of the connection of the swept-back airfoils. A third pair of substantially vertical airfoils is provided between the tips of the swept-forward airfoils and the lower side of the swept-back airfoils.

The propulsion system has one engine mounted in the extension middle of each of the first swept-back airfoils, either directly or on top of a further stand. The swept-back airfoils extend with an outwardly upwards angle with respect to the horizontal plane. The second pair of swept-forward airfoils are frankly shaped.

The document U.S. Pat. No. 4,856,736 describes an aircraft having paired aerofoils where wing tips are joined in the same plane one behind the other. The trailing edge of the forward wings and the leading edge of the rearward wings is coincidental in plan view at the wing tip. A single propeller is mounted at a front end of the fuselage in an embodiment. A pair of propellers is mounted at a front end of the fuselage, each on a canard pole, in another embodiment.

The document U.S. Pat. No. 6,098,923 describes a jet aircraft structure that provides inherent directional stability, even at very high angles-of-attack where conventional means of stabilization are ineffective. Components attached to an aircraft fuselage include a wing, horizontal stabilizers and vertical stabilizers. On the fuselage, are provided a front inlet and a rear exhaust nozzle.

The document U.S. Pat. No. 2,290,850 describes a folding wing airplane, where end sections of each wings can be folded upwards. The fuselage includes a front central propeller.

The document U.S. Pat. No. 8,657,226 describes synergistic control enhancement and drag reduction benefits in an aircraft having independent airfoils producing downward force opposite to wing lift in normal flight. The airfoils are supported in specific wingtip locations. The aircraft is of fixed wing type, with propellers mounted on the fuselage, on poles in some embodiments.

The document US 2013/0175383 describes another compound rotorcraft with fixed wing arrangement in the form of a joined-wing configuration having lower and upper wings that are each parallel to a given pitch axis of the compound rotorcraft. The wings exhibit a constant dihedral and the upper wings entirely cover the lower wings so as to minimize down-wash drag. This translates to a design with same depth of the wings, same wing orientation, and same position of attachment of the upper and lower wings.

However, all of the above-described compound rotorcrafts have drawbacks when used as high-speed rotorcrafts, as their fixed wing arrangements are not optimized with respect to high-speed regime in operation of the compound rotorcrafts. Furthermore, the respective wings of the fixed wing arrangements are not adequate for main landing gear integration and they can be improved with respect to wing interconnection and wing-to-fuselage transition. Moreover, the operational efficiency of these compound rotorcrafts as a whole can be improved.

BRIEF SUMMARY OF THE INVENTION

It is, therefore, an object of the present invention to provide a new compound rotorcraft that overcomes the above described drawbacks.

This object is solved by a compound rotorcraft with a fuselage, at least one main rotor that is at least adapted for generating lift in operation, and a fixed wing arrangement that is laterally attached to the fuselage, said compound rotorcraft comprising the features of claim 1.

The invention provides useful enhancements responding most of the above drawbacks faced by nowadays fixed wings rotorcrafts.

This is reached by providing an angled lower wing forming a so-called "kink" at the sections interconnection region where inboard and outboard sections of the lower wing connects. With the inventive kinked lower wing, the main landing gear can be located about this sections interconnection region since mounted on the inboard section structurally integrated to the fuselage. Part of efforts e.g. involved at landing of the rotorcraft, are shared within the framework structure of the fixed lower and upper wings. This goes against the classical teachings in the aircraft structure engineering that usually considers as inadequate, providing a connection such as a hinge inside the lower wing between fuselage and each lateral propeller.

More specifically, according to the present invention a compound rotorcraft with a fuselage and at least one main rotor that is at least adapted for generating lift in operation is provided. The fuselage comprises a lower side and an upper side that is opposed to the lower side. The at least one main rotor is arranged at the upper side. At least one propeller is provided that is at least adapted for generating forward thrust in operation, the at least one propeller being mounted to a fixed wing arrangement that is laterally attached to the fuselage. The fixed wing arrangement comprises at least one upper wing that is arranged at an upper wing root joint area provided at the upper side of the fuselage and at least one lower wing that is arranged at a lower wing root joint area provided at the lower side of the fuselage. The upper and lower wings are at least interconnected at an associated interconnection region. The lower wing comprises an inboard section defining a first quarter chord line and a first centroid axis and an outboard section defining a second quarter chord line and a second centroid axis. The inboard section is connected to the fuselage at the lower wing root joint area and to the outboard section at a sections interconnection region. The outboard section is connected to the inboard section at the sections interconnection region and to the upper wing at the associated interconnection region. The second centroid axis is inclined relative to the first centroid axis by a relative dihedral angle that is defined in a first coordinate plane. The second quarter chord line is inclined relative to the first quarter chord line by a relative sweep angle that is defined in a second coordinate plane.

In general, the compound rotorcraft according to the present invention comprises a specific arrangement and planform of an underlying bi-plane wing structure on each side of the compound rotorcraft, with a main rotor providing lift and a pair of additional propulsion devices, i.e. propellers, providing thrust. The bi-plane wing structure on each side of the compound rotorcraft provides additional lift during horizontal cruise flight. The additional propulsion devices are arranged on the underlying bi-plane wing structure at the intersections of respective wings, preferentially one at each side of the compound rotorcraft.

More specifically, the inventive compound rotorcraft preferably comprises a new joined-wing configuration with a new wing planform. In contrast to a conventional wing planform with boxed or joined wings, wherein the wings are essentially straight along their spanwise extension and respectively exhibit an essentially constant sweep and constant dihedral, the new wing planform according to the present invention uses a unique shape and layout of a given lower wing featuring a simultaneous "polyhedral" and "multi-sweep" design. The term "polyhedral" addresses use of two different wing portions with two different dihedral angles, whereas the term "multi-sweep" addresses use of two different wing portions with two different sweep angles.

The dihedral angle is defined as an angle of the centroid axis of the wing with respect to the horizontal Y-axis, i.e. pitch axis, of the compound rotorcraft and basically represents an inclination of the wing in a front view plane of the compound rotorcraft with respect to a horizontal plane. The sweep angle is defined as an angle between the quarter chord line of the wing and a transverse Y-axis of the rotorcraft, the quarter chord line being the line which spans 25% of the wing chord. The lower wing is, hence, characterized by a cranked layout with one inboard section and one outboard section, both featuring different dihedral and sweep angles.

Advantageously, reduction of the dihedral angle of the lower wing at its root region improves an underlying aerodynamic efficiency of a given wing-fuselage transition. Furthermore, reduction of the sweep angle at the inboard wing section allows keeping its rear main spar away from a predefined propeller burst cone and allows for a clean transition layout from the lower wing's trailing edge to the intermediate compound rotorcraft structure.

The inboard section of the lower wing preferably exhibits a lower dihedral angle and lower sweep angle in comparison to the outboard section. An almost un-swept inboard section with a low sweep angle, essentially perpendicular to the longitudinal axis of the compound rotorcraft, is advantageous with respect to main landing gear integration and to a resulting aerodynamic center of lift. Main landing gear integration with standard kinematics preferably requires perpendicular support elements at each side of the main landing gear, which are conveniently provided by the two spars of the inboard section. An underlying aerodynamic center of lift should not exceed a specific longitudinal distance from an underlying center of gravity in order to maintain adequate aerodynamic balance at high-speed operation of the compound rotorcraft.

According to one aspect of the present invention, a main landing gear is attached to the lower wing at its kink region, i.e. a transition region of the inboard section of the lower wing to the outboard section of the lower wing, and at least partially housed, in its retracted position, within the inboard section. The kink region separates the inboard section from the outboard section and is preferably a structural releasable joint that allows an easy separation of both lower wing sections from each other.

Advantageously, separation of the lower wing into an inboard section and an outboard section allows for a structural integration of the inboard section and the main landing gear to the fuselage. Hence, a disassembly of the lower wing and/or the lower and upper wings does not involve a removal of the main landing gear from the fuselage. Furthermore, in a storage or transportation condition the inventive compound rotorcraft is able to stay on its own supports.

The inboard section is preferably a structural part of the fuselage which integrates the main landing gear attachment points. The attachment of the inboard section to the outboard section can either be hinged or clamped. A purely hinged joint has fewer interconnections and lesser associated assembly tolerance issues.

Advantageously, in the case of a hinged joint between the inboard section and the outboard section, a dihedral kink introduces in a load scenario with large down loads a transverse load and bending load component which counteracts—at least to a certain extent—respective reaction loads of the main landing gear. Thus, an underlying stress state of respective main load carrying members of the inboard section and its structural interconnection to the fuselage can be alleviated. The dihedral kink provides for a roughly 10% larger airfoil thickness of the inboard section of the lower wing in comparison to the outboard section, hence providing for additional available volume for the main landing gear introduction without a need for increasing or tapering the thickness of the outboard section.

Advantageously, an underlying wheel base, i.e. a distance between left-hand and right-hand wheels of the main landing gear, is increased by the new two-plane joined wing configuration without increasing an underlying length and consequently a respective weight of the main landing gear. More specifically, especially high speed compound rotorcrafts require fuselages with reduced widths and reduced front masking areas. This is crucial aiming at a reduction of an underlying aerodynamic drag for increasing the performance and efficiency of the compound rotorcrafts. Narrow fuselage bodies, however, require a particularly large wheel base in order to ensure ground stability and avoid overturn.

In the case of a compound rotorcraft with two propellers with considerable diameter at each side of its fuselage, there is a crucial need for ground clearance in order to avoid a clash of the propellers to the ground. This safety requirement leads to a minimum ground clearance angle off the horizontal from an underlying main wheel position to a given propeller disc, which is a function of a position of the propeller, its diameter and the wheel base. The position of the propeller and its diameter are a function of the compound rotorcraft performance requirements and are simultaneously constrained by a required clearance between respective rotor blades of the at least one main rotor and the propeller. Hence, basic parameters to influence the ground clearance are the wheel base and a predetermined height of the main landing gear.

Based on these clearance requirements, narrow fuselage bodies tend to require long and heavy main landing gears. While conventional joined-wing configurations with joined wings and a pronounced and constant dihedral on the lower wing as described above alleviate this tendency, since they allow integration of the main landing gear to the lower wing of the joined-wing configuration instead of the fuselage, the new joined-wing configuration allows maintaining a constant length and, consequently, a constant weight of the main landing gear independently of its wheel base. Thus, the new joined-wing configuration provides for a favourable flexibility in terms of the main landing gear arrangement in view of the clearance requirements.

It should, however, be noted that an additional wing structural weight resulting from the above described kink design of the lower wing and a respective diminution of specific stiffness is negligible in comparison to an obtained main landing gear weight reduction resulting from its length reduction. In comparison to a conventional joined-wing configuration with a conventional straight, monohedral lower wing, the new joined-wing configuration enables provision of a 10% lighter main landing gear.

Furthermore, the new joined-wing configuration and the new wing planform allow for an easy integration of conventional main landing gears with simple designs and retraction kinematics, hence providing for less development risks, lesser weight and larger robustness. The main landing gears can be designed to rotate during retraction around an essentially longitudinal axis and be housed—at least partially—within the inboard section of the lower wing at the largest width between two main spars, the spars being essentially perpendicular to the longitudinal compound rotorcraft axis.

According to one aspect of the present invention, a leading and trailing edge root extension can be integrated within the inboard section of the lower wing. The strake allows for an increase of lift for combat manoeuvring and switches the aerodynamic center of lift further fore. Furthermore, it offers additional volume for equipment housing.

According to one aspect of the present invention, the new two-plane joined-wing configuration is realizable either with a positive stagger or a negative stagger. A positive stagger results by a leading edge of the upper wing being ahead, i.e. upstream, of a leading edge of the lower wing. A negative stagger results by the leading edge of the upper wing being behind, i.e. downstream, of the leading edge of the lower wing.

A positive stagger is rather suitable for a tricycle landing gear arrangement, with two main wheels aft of the compound rotorcraft's center of gravity and an auxiliary wheel ahead of the center of gravity. In contrast, a negative stagger is rather suitable for a tail dragger landing gear arrangement, with two main wheels forward of the compound rotorcraft's center of gravity and an auxiliary wheel at its tail.

According to a preferred embodiment, the relative dihedral angle is comprised in a range between 5° and 45° and the first coordinate plane is defined by a front view plane of the compound rotorcraft.

According to a further preferred embodiment, the relative sweep angle is comprised in a range between 5° and 45° and the coordinate plane is defined by a top view plane of the compound rotorcraft.

According to a further preferred embodiment, the upper wing is removably attached to the upper wing root joint area and the outboard section is removably attached to the inboard section at the sections interconnection region.

According to a further preferred embodiment, the upper wing is removably attached to the upper wing root joint area by means of a hinged root joint and the outboard section is removably attached to the inboard section at the sections interconnection region by means of a hinged joint or a clamped joint.

According to a further preferred embodiment, the outboard section comprises wing spars and the fuselage is provided with wing attachment frames. The hinged joint or the clamped joint connects the wing spars to the wing attachment frames.

According to a further preferred embodiment, a wheel-type main landing gear is provided. The wheel-type main landing gear is mounted to the inboard section, adjacent to the sections interconnection region.

According to a further preferred embodiment, the wheel-type main landing gear is at least partly retractable into the inboard section in operation.

According to a further preferred embodiment, the first quarter chord line is at least essentially parallel to the first coordinate plane with a maximum variance comprised in a range of ±50°.

According to a further preferred embodiment, the inboard section exhibits a negative dihedral angle comprised in a range between −30° to 30°.

According to a further preferred embodiment, the inboard section is an integral part of the fuselage.

According to a further preferred embodiment, the outboard section comprises a span length that is at least two to ten times longer than a span length of the inboard section.

According to a further preferred embodiment, the lower wing root joint area and the upper wing root joint area define a transversal wing attachment basis in height direction of the fuselage and a longitudinal wing attachment basis in longitudinal direction of the fuselage. The transversal wing attachment basis is at least one to five times larger than the longitudinal wing attachment basis.

According to a further preferred embodiment, the at least one propeller is mounted to the associated interconnection region.

According to a further preferred embodiment, the fixed wing arrangement comprises at least one pair of upper and lower wings arranged on a port side of the compound rotorcraft and at least one pair of upper and lower wings arranged on a starboard side of the compound rotorcraft. The at least one pair of upper and lower wings arranged on the starboard side of the compound rotorcraft comprise the at least one upper wing and the at least one lower wing.

BRIEF DESCRIPTION OF THE SEVERAL VIEWS OF THE DRAWINGS

Preferred embodiments of the invention are outlined by way of example in the following description with reference to the attached drawings. In these attached drawings, identical or identically functioning components and elements are labeled with identical reference numbers and characters and are, consequently, only described once in the following description.

DETAILED DESCRIPTION OF THE INVENTION

Figure 1:
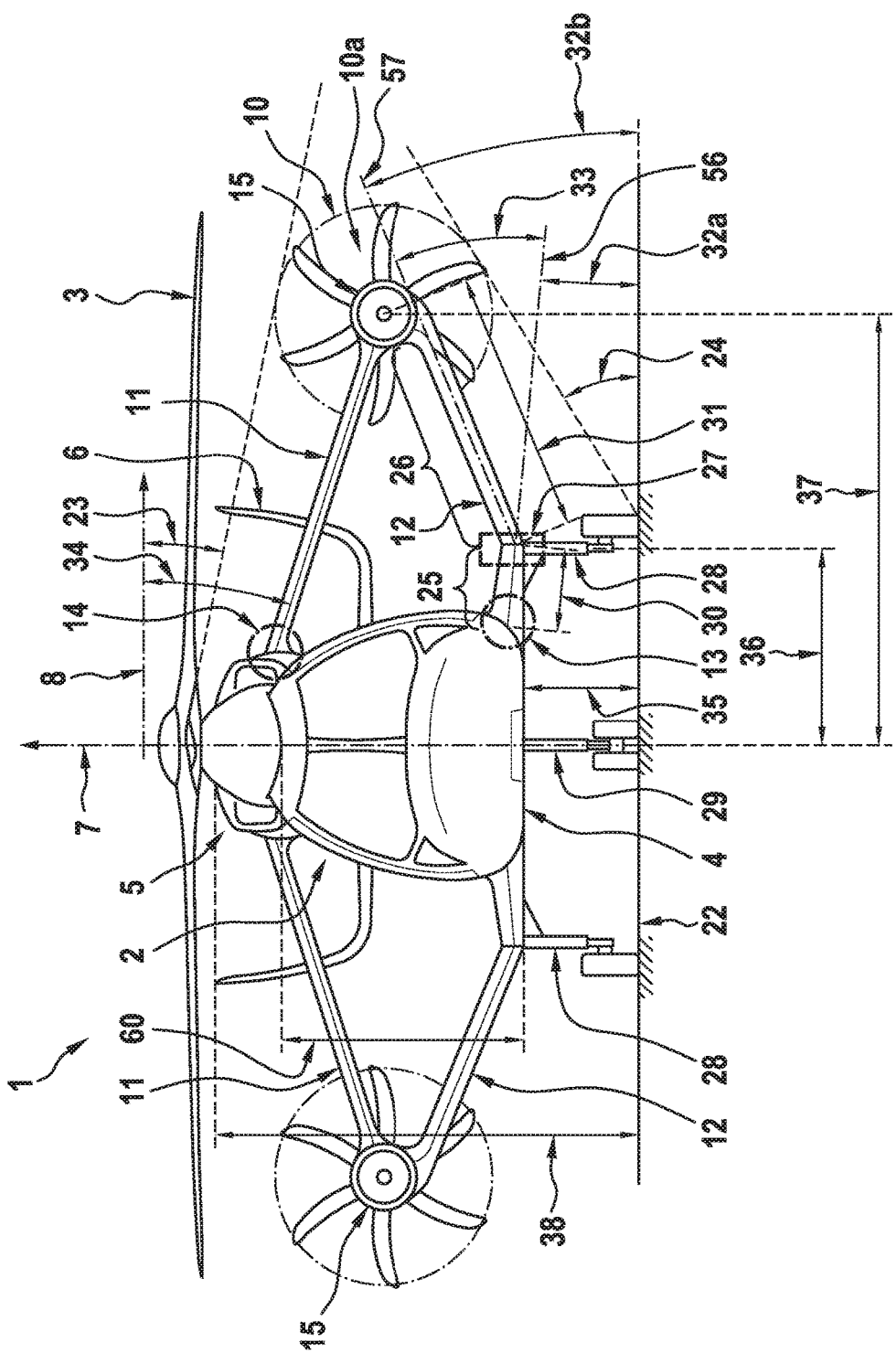
FIG. 1 shows a front view of a compound rotorcraft according to a first embodiment of the present invention.

FIG. 1 shows a compound rotorcraft 1 according to the present invention. The compound rotorcraft 1 illustratively comprises a fuselage 2 with an overall height 38, which exhibits a lower side 4 and an upper side 5 that is opposed to the lower side 4. Furthermore, the compound rotorcraft 1 comprises at least one main rotor 3 that is at least adapted for generating lift in operation. The at least one main rotor 3 is arranged at the upper side 5 of the fuselage 2 and, by way of example, an empennage 6 is rigidly mounted to a tail boom (16 in FIG. 2) defined by the fuselage 2.

Figure 2:
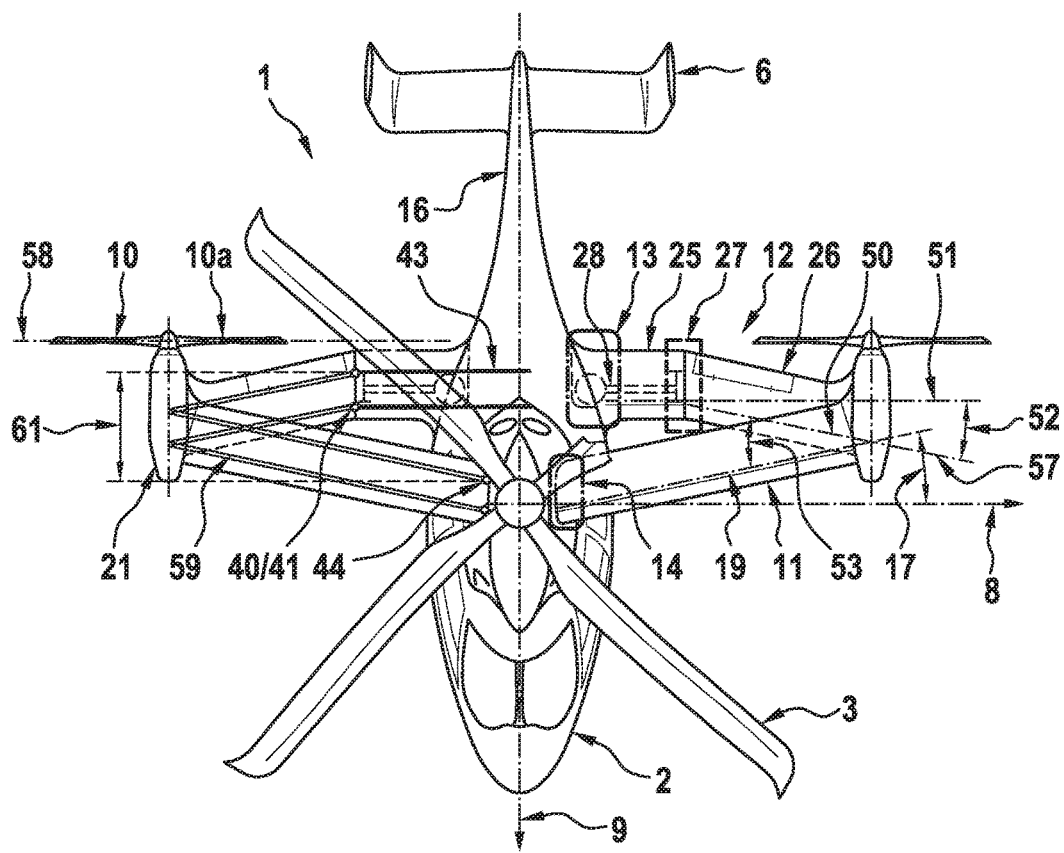
FIG. 2 shows a top view of the compound rotorcraft of FIG. 1.

For purposes of illustration, the compound rotorcraft 1 is shown with three mutually orthogonal directions X, Y and Z forming a three-dimensional frame of reference XYZ. A "longitudinal" direction X corresponds to the roll axis (9 in FIG. 2) inherent to the compound rotorcraft 1. Another direction Y, said to be "transverse", is perpendicular to the roll axis (9 in FIG. 2) and corresponds to the pitch axis 8 of the compound rotorcraft 1. The X-Y plane is considered to be "horizontal" and corresponds to a top view plane of the compound rotorcraft 1, cp. FIG. 2. A third direction Z corresponds to the yaw axis 7 of the compound rotorcraft 1, oriented perpendicular with respect to the X-Y plane. The Y-Z plane corresponds to the front view plane of the compound rotorcraft 1 as illustrated in FIG. 1. According to one aspect of the present invention, the compound rotorcraft 1 is symmetrical about the yaw axis 7 and the roll axis (9 in FIG. 2).

Preferably, the compound rotorcraft 1 comprises at least one propeller 10 that is at least adapted for generating forward thrust in operation. The at least one propeller 10 is preferentially mounted to a fixed wing arrangement 11, 12 that is laterally attached to the fuselage 2. Illustratively, the compound rotorcraft 1 comprises two propellers 10, one on each side of the fuselage 2. A predetermined distance between an underlying rotational axis of each one of the propellers 10 and the Z-axis 7 preferably corresponds at least essentially to a half wing span 37 of the compound rotorcraft 1.

According to one aspect of the present invention, the fixed wing arrangement 11, 12 comprises at least one upper wing 11 that is arranged at an upper wing root joint area 14 provided at the upper side 5 of the fuselage 2, and at least one lower wing 12 that is arranged at a lower wing root joint area 13 provided at the lower side 4 of the fuselage 2. In the illustrated Y-Z plane, a predetermined distance in z-direction between both the lower wing root joint area 13 and the upper wing root joint area 14 defines a transversal wing attachment basis 60.

By way of example, the fixed wing arrangement 11, 12 comprises at least one pair of upper and lower wings 11, 12 arranged on a port side of the compound rotorcraft 1 and at least one pair of upper and lower wings 11, 12 arranged on a starboard side of the compound rotorcraft 1. At least one pair of upper and lower wings 11, 12 arranged on the starboard side and/or on the port side of the compound rotorcraft 1 comprises the at least one upper wing 11 and the at least one lower wing 12, which are described in greater detail hereinafter.

Preferably, the upper and lower wings 11, 12 are at least interconnected at an associated interconnection region 15. At least one of the two propellers 10 is mounted to the associated interconnection region 15.

The upper wing 11 preferably exhibits an anhedral angle 34 relative to the horizontal Y-axis 8 of the compound rotorcraft 1. The lower wing 12 is preferentially polyhedral and comprises an inboard section 25 with a span length 30 and an outboard section 26 with a span length 31. Preferably, the span length 31 is at least two to ten times longer than the span length 30.

The inboard section 25 is preferably connected to the fuselage 2 at the lower wing root joint area 13 and to the outboard section 26 at a sections interconnection region 27. Preferentially, the inboard section 25 is an integral part of the fuselage 2. The outboard section 26 is connected to the inboard section 25 at the sections interconnection region 27 and to the upper wing 11 at the associated interconnection region 15.

According to one aspect of the present invention, the outboard section 26 is removably attached to the inboard section 25 at the sections interconnection region 27 and the upper wing 11 is removably attached to the upper wing root joint area 14. Illustratively, the inboard section 25 is at least essentially horizontal, whereas the outboard section 26 is at least essentially inclined upwardly, such that the sections interconnection region 27 preferably defines a dihedral kink of the lower wing 12.

The inboard section 25 illustratively defines a first quarter chord line (51 in FIG. 2) and a first centroid axis 56. The outboard section 26 illustratively defines a second quarter chord line (50 in FIG. 2) and a second centroid axis 57.

The inboard section 25 and the outboard section 26 exemplarily exhibit different dihedral angles 32a, 32b. Each dihedral angle 32a, 32b is defined as an angle of the respective centroid axis 56, 57 of the inboard respectively outboard section 25, 26 with respect to the horizontal Y-axis 8 of the compound rotorcraft 1. In other words, the dihedral angle 32a is defined as the angle of the centroid axis 56 with respect to the horizontal Y-axis 8 and the dihedral angle 32b is defined as the angle of the centroid axis 57 with respect to the horizontal Y-axis 8. The dihedral angle 32a is essentially horizontal, whereas the dihedral angle 32b represents a pronounced upward angle from the horizontal Y-axis 8, i.e. a positive dihedral.

According to one aspect of the present invention, the second centroid axis 57 is inclined relative to the first centroid axis 56 by a relative dihedral angle 33. The latter is defined in a coordinate plane that is defined by a front view plane of the compound rotorcraft 1, i.e. the illustrated Y-Z plane, as a difference angle between the dihedral angles 32a, 32b. Preferably, the relative dihedral angle 33 is comprised in a range between 5° and 45°. The inboard section 25 exhibits a dihedral angle 32a comprised in a range between −30° to 30°.

According to one aspect of the present invention, the compound rotorcraft 1 comprises a wheel-type main landing gear 28. The latter is preferably mounted to the inboard section 25 of the lower wing 12, preferentially adjacent to the sections interconnection region 27. Furthermore, the wheel-type main landing gear 28 is preferentially at least partly retractable into the inboard section 25 in operation of the compound rotorcraft 1. An underlying distance between the Z-axis 7 and a predetermined landing gear standing position, e.g. as illustrated on ground 22, is defined as a so-called half wheel base 36.

Illustratively, the compound rotorcraft 1 further comprises a wheel-type nose landing gear 29. The latter is preferably arranged at a nose section of the fuselage 2, i.e. upstream of the main landing gear 28.

It should be noted that it is required for a safe operation of the compound rotorcraft 1 to maintain on the one hand a specified clearance between a given contact point of the main landing gear 28 with the ground 22 and a given disc 10a of the propeller 10, defined by an underlying ground clearance angle 24, and on the other hand a specified clearance between the at least one main rotor 3 and the propeller disc 10a, defined by a clearance angle 23. Consequently, the mutual configuration of an underlying landing gear length/clearance to ground 35, the half wheel base 36, the half wing span 37, the propeller disc 10a and the overall fuselage height 38 are a function of the clearance angles 23, 24. For instance, a larger half wheel base 36 leads to a larger span length 30 of the inboard section 25 and allows provision of a smaller overall fuselage height 38 and a reduced landing gear length for a given ground clearance angle 24, and so on.

FIG. 2 shows the compound rotorcraft 1 of FIG. 1 with the fuselage 2 having a tail boom 16, to which the empennage 6 is rigidly mounted. FIG. 2 further illustrates the roll axis that is inherent to the compound rotorcraft 1, i.e. X-axis 9.

As described above with reference to FIG. 1, the compound rotorcraft 1 further comprises the at least one main rotor 3, the fixed wing arrangement 11, 12, the two propellers 10 and the main landing gear 28. Preferably, each one of the propellers 10 comprises a housing 21 that is rigidly attached to an associated one of the interconnection regions 15 of FIG. 1. Illustratively, the propeller disc 10a of each propeller spans up a propeller disc plane 58. The fixed wing arrangement 11, 12 comprises the upper and lower wings 11, 12, wherein the lower wing 12 is composed of the inboard section 25 and the outboard section 26. Preferably, the upper wing 11 is removably attached to the upper wing root joint area 14 by means of a hinged root joint 44.

Illustratively, the fixed wing arrangement out of 11 and 12 shows a positive stagger, with a leading edge of the upper wing 11 being ahead of corresponding leading edges of the inboard section 25 and the outboard section 26 of the lower wing 12. The stagger is defined as a difference in longitudinal position of the axis of two wings of the compound rotorcraft 1. The main landing gear 28 is preferentially mainly housed within the inboard section 25 and partially within the fuselage 2.

According to one aspect of the present invention, the outboard section 26 of the lower wing 12 is removably attached to the inboard section 25 thereof at the sections interconnection region 27 by means of a hinged joint 40 or a clamped joint 41. Preferably, the outboard section 26 comprises wing spars 59 and the fuselage 2 is provided with wing attachment frames 43. The hinged joint 40 or the clamped joint 41 preferentially connects the wing spars 59 to the wing attachment frames 43. The clamped joint 41 is capable of transferring moments about all axes, i.e. the Z-axis 7 of FIG. 1, the Y-axis 8 and the X-axis 9, whereas the hinged joint 40 is not capable of transferring moments about the longitudinal X-axis 9.

Illustratively, the inboard section 25 defines a first quarter chord line 51 and the outboard section 26 defines a second quarter chord line 50. The first quarter chord line 51 is preferentially at least essentially parallel to the coordinate plane that is defined by the front view plane of the compound rotorcraft 1, i.e. the Y-Z plane illustrated in FIG. 1.

As described above with reference to FIG. 1, the upper wing 11 is arranged at the upper wing root joint area 14 and the lower wing 12 is arranged at the lower wing root joint area 13, both of which define the transversal wing attachment basis 60 in height direction of the fuselage 2, i.e. in direction of the Z-axis 7. Illustratively, the lower wing root joint area 13 and the upper wing root joint area 14 further define a longitudinal wing attachment basis 61 in longitudinal direction of the fuselage 2, i.e. along the roll axis of the compound rotorcraft 1 that defines the X-axis 9. The transversal wing attachment basis 60 is preferably at least one to five times larger than the longitudinal wing attachment basis 61.

According to one aspect of the present invention, the lower wing 12 is multi-swept with the inboard section 25 and the outboard section 26, which exhibit different sweep angles. Each sweep angle is defined as an angle of a respective one of the quarter chord lines 50, 51 with respect to the horizontal Y-axis 8 of the compound rotorcraft 1. Furthermore, a relative sweep angle 52 is a difference angle between the sweep angles of the inboard section 25 and the outboard section 26. Preferably, the relative sweep angle 52 is defined by an inclination of the second quarter chord line 50 relative to the first quarter chord line 51, which is defined in a coordinate plane that is defined by a top view plane of the compound rotorcraft 1, i.e. the X-Y plane illustrated in FIG. 2. The relative sweep angle 52 is preferably comprised in a range between 5° and 45°.

Illustratively, with respect to the lower wing 12, the first quarter chord line 51 is essentially horizontal, whereas the second quarter chord line 50 preferably exhibits a pronounced forward angle from the horizontal Y-axis 8, i.e. a negative sweep. With respect to the upper wing 11, a quarter chord line 19 thereof preferably essentially exhibits a rearward sweep angle 17 from the horizontal Y-axis 80. The quarter chord line 19 and the quarter chord line 57 of the outboard section 26 illustratively define a relative sweep angle 53 between the upper wing 11 and the outboard section 26.

Figure 3:
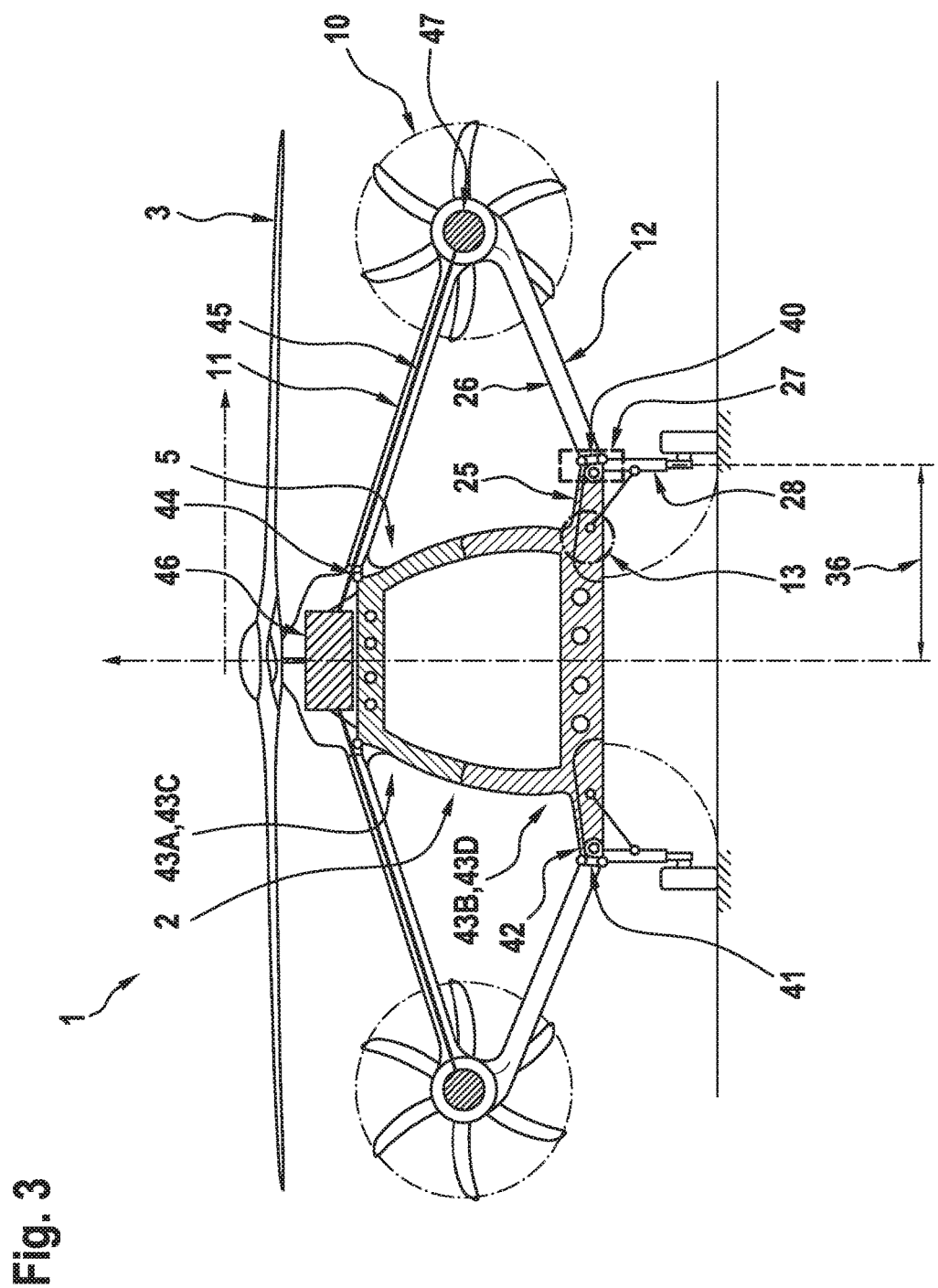
FIG. 3 shows a sectional view of the compound rotorcraft of FIG. 1.

FIG. 3 shows the compound rotorcraft 1 of FIG. 1 with the fuselage 2, the at least one main rotor 3, the fixed wing arrangement 11, 12, the two propellers 10 and the main landing gear 28. Each one of the two propellers 10 is preferably powered by an associated propeller drive shaft 45, which is housed within the upper wing 11 and preferentially connects a main gar box 46 of the compound rotorcraft 1, illustratively arranged on the upper side 5 of the fuselage 2, with a respective propeller gear box 47. The fixed wing arrangement 11, 12 comprises the upper and lower wings 11, 12, wherein the lower wing 12 is composed of the inboard section 25 and the outboard section 26.

Illustratively, the inboard section 25 is a structural part of the fuselage 2 and the main landing gear 28 has an associated trunnion joint 42 that is allocated within the inboard section 25. Corresponding attachment spars, which are usually provided in the lower wing 12 and in the upper wing 11 (59 in FIG. 2), are connected to associated wing attachment frames 43C, 43D. Illustratively, attachment spars that are provided in the lower wing 12 are connected to lower portions 43B of its associated wing attachment frame 43D allocated within the inboard section 25. The upper wing 11 is connected to an upper portion 43A of its associated wing attachment frame 43C, preferably by the hinged root joint 44, which is not capable of transferring moments about the longitudinal X-axis 9 of FIG. 2.

Figure 4:
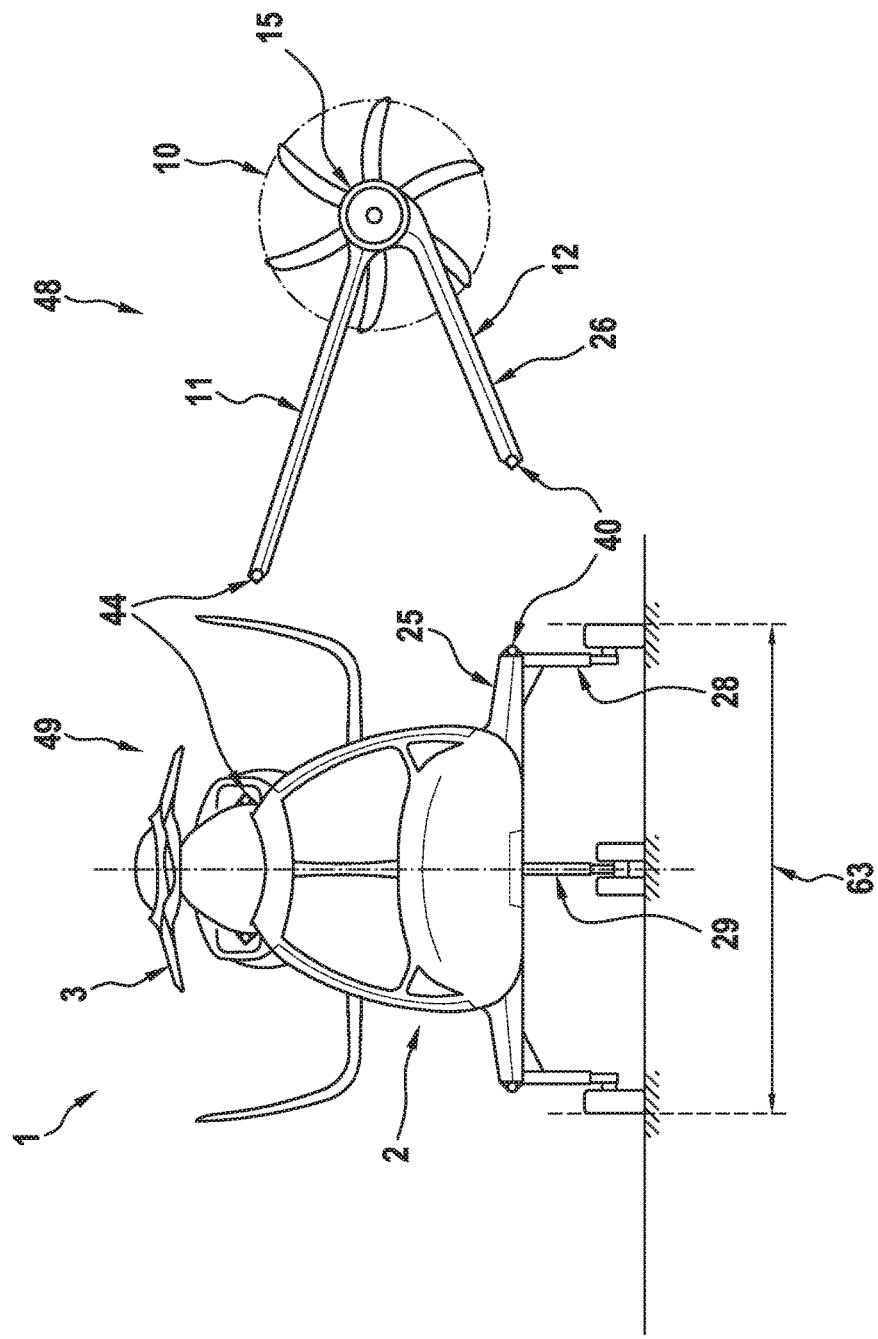
FIG. 4 shows a front view of the compound rotorcraft of FIG. 1 in transportation condition.

FIG. 4 shows the compound rotorcraft 1 of FIG. 1 with the fuselage 2, the at least one main rotor 3, the fixed wing arrangement 11, 12, one of the two propellers 10 and the main landing gear 28. The fixed wing arrangement 11, 12 comprises the upper and lower wings 11, 12, wherein the lower wing 12 is composed of the inboard section 25 and the outboard section 26.

Illustratively, the compound rotorcraft 1 is shown in an exemplary transportation condition, corresponding to a transport or storage configuration. More specifically, in this transportation condition the upper wing 11 and the outboard section 26 of the lower wing 12 are preferably dismounted. Consequently, the propeller 10, which is arranged at the interconnection region 15 of the upper and lower wings 11, 12, is likewise dismounted from the compound rotorcraft 1. The upper wing 11, the outboard section 26 and the propeller 10 illustratively define a wing assembly 48.

The resulting wingless compound rotorcraft, which is illustratively referred to with the reference number 49, is shown with folded rotor blades of the at least one main rotor 3 and stands on its main landing gear 28 and its nose landing gear 29. Preferably, the wingless compound rotorcraft 49 has a total width 63 that preferably corresponds to a maximum allowable width for transportability.

According to one aspect of the present invention, the wing assembly 48 including the upper wing 11, the outboard section 26 and the propeller 10 is separately assembled, stored and transported and preferably re-assembled as a pre-assembled unit to the wingless compound rotorcraft 49. This can easily be done by connecting the upper wing hinged root joint 44 and the lower hinged or clamped joint 40, respectively 41, of FIG. 2 and FIG. 3.

Figure 5:
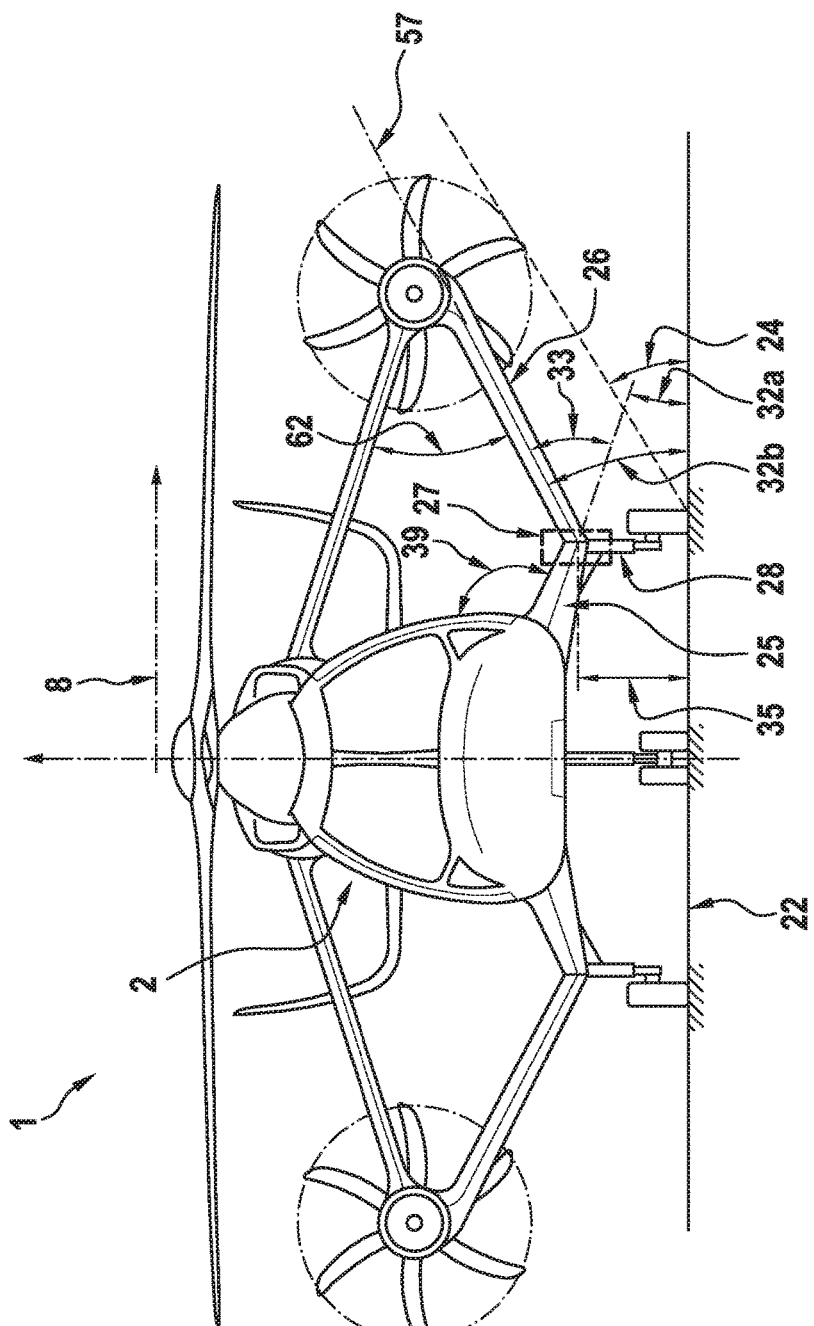
FIG. 5 shows a front view of a compound rotorcraft according to a second embodiment of the present invention.

FIG. 5 shows the compound rotorcraft 1 of FIG. 1 with the fuselage 2, the at least one main rotor 3, the fixed wing arrangement 11, 12, one of the two propellers 10 and the main landing gear 28. The fixed wing arrangement 11, 12 comprises the upper and lower wings 11, 12, wherein the lower wing 12 is composed of the inboard section 25 and the outboard section 26. However, in contrast to FIG. 1 the inboard section 25 now exhibits a negative dihedral angle 32, which is preferably comprised in a range between 0° to 30°.

More specifically, the negative dihedral angle 32 defines a pronounced downward angle from the horizontal Y-axis 8. This advantageously results in a shorter required landing gear length 35, a larger upward fillet angle 39 of the inboard section 25 to the fuselage 2, a larger wing interference angle 62 between the outboard section 26 and the upper wing 11, and a more pronounced dihedral angle 32b of the outboard section 26.

Figure 6:
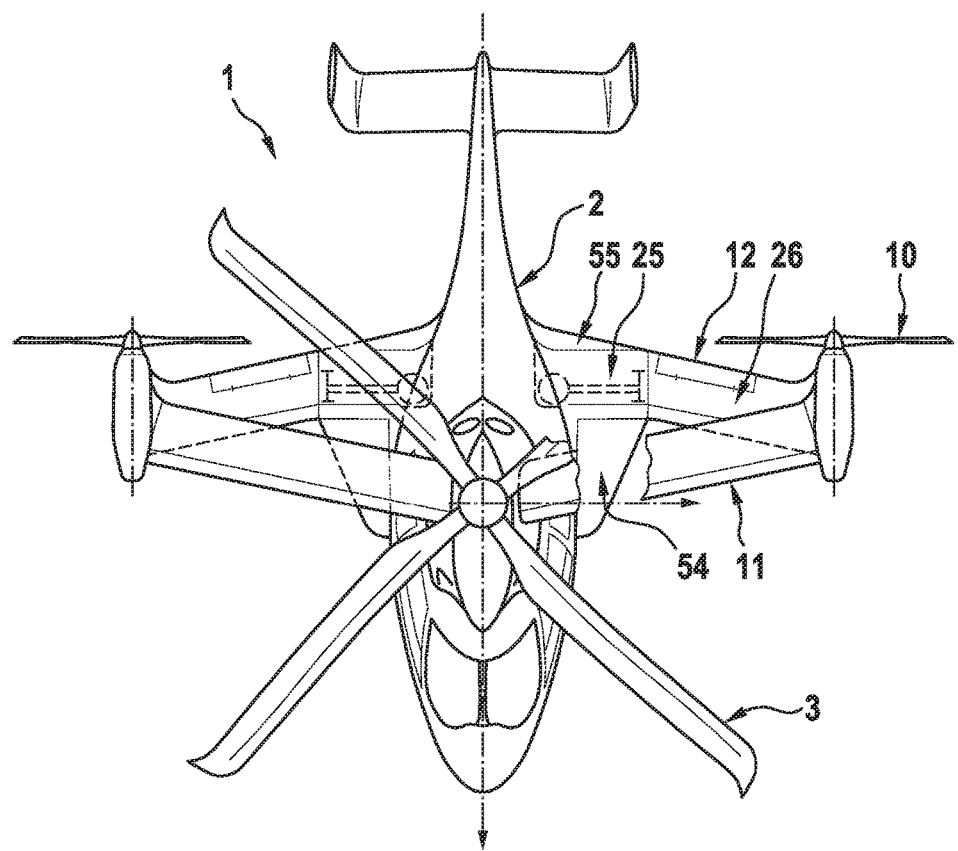
FIG. 6 shows a top view of the compound rotorcraft of FIG. 5.

FIG. 6 shows the compound rotorcraft 1 of FIG. 1 with the fuselage 2, the at least one main rotor 3, the fixed wing arrangement 11, 12 and the two propellers 10. The fixed wing arrangement 11, 12 comprises the upper and lower wings 11, 12, wherein the lower wing 12 is composed of the inboard section 25 and the outboard section 26. However, in contrast to FIG. 1 the inboard section 25 now comprises a pronounced leading edge root extension 54 and a trailing edge root extension 55.

Finally, it should be noted that further modifications are also within the common knowledge of the person skilled in the art and, thus, also considered as being part of the present invention.

REFERENCE LIST

1 Compound rotorcraft
2 Fuselage
3 Main Rotor
4 Lower side of fuselage
5 Upper side of fuselage
6 Empennage
7 Yaw axis
8 Pitch axis
9 Roll axis
10 Propeller
10a Propeller disc
11 Upper wing
12 Lower wing
13 Lower wing root joint area
14 Upper wing root joint area
15 Wing interconnection region of upper and lower wings
16 Tail boom
17 Upper wing sweep angle
18 Lower wing sweep angle
19 Upper wing quarter chord line
20 Lower wing quarter chord line
21 Propeller housing
22 Ground
23 Rotor clearance angle to propeller
24 Ground clearance angle to propeller
25 Lower wing inboard section
26 Lower wing outboard section
27 Sections interconnection region
28 Wheel-type main landing gear
29 Wheel-type nose landing gear
30 Span length of lower wing inboard section
31 Span length of lower wing outboard section
32a Dihedral angle of lower wing inboard section relative to horizontal (ground) plane
32b Dihedral angle of lower wing outboard section relative to horizontal (ground) plane
33 Relative dihedral angle of lower wing outboard section relative to lower wing inboard section
34 Anhedral angle of upper wing relative to horizontal direction
35 Length of main landing gear/clearance to ground
36 Half wheel base
37 Half wing span
38 Fuselage height
39 Upward fillet angle of lower wing inboard section relative to fuselage
40 Lower wing outboard section hinged joint
41 Lower wing outboard section clamped joint
42 Main landing gear trunnion joint
43, 43C, 43D Wing attachment frame
43A Upper portion of wing attachment frame
43B Lower portion of wing attachment frame
44 Upper wing hinged root joint
45 Propeller drive shaft
46 Main gear box
47 Propeller gear box
48 Wing assembly
49 Wingless rotorcraft
50 Quarter chord line of lower wing outboard section
51 Quarter chord line of lower wing inboard section
52 Relative sweep angle between lower wing inboard/outboard sections
53 Relative sweep angle between upper wing and lower wing outboard section
54 Leading edge root extension
55 Trailing edge root extension
56 Centroid axis of lower wing inboard section
57 Centroid axis of lower wing outboard section
58 Propeller disc plane
59 Wing spar
60 Transversal wing attachment basis
61 Longitudinal wing attachment basis
62 Wing interference angle
63 Total wingless rotorcraft width

What is claimed is:

1. A compound rotorcraft with a fuselage and at least one main rotor that is at least adapted for generating lift in operation, the fuselage comprising a lower side and an upper side that is opposed to the lower side, the at least one main rotor being arranged at the upper side, wherein the compound rotorcraft comprises at least one propeller at least adapted for generating forward thrust in operation, the at least one propeller being mounted to a fixed wing arrangement that is laterally attached to the fuselage, the fixed wing arrangement comprising at least one upper wing that is arranged at an upper wing root joint area provided at the upper side of the fuselage and at least one lower wing that is arranged at a lower wing root joint area provided at the lower side of the fuselage, the upper and lower wings being at least interconnected at an associated interconnection region, each of the at least one propeller being mounted to an associated interconnection region; the compound rotorcraft being provided with a wheel-type main landing gear, wherein the lower wing comprises an inboard section defining a first quarter chord line and a first centroid axis and an outboard section defining a second quarter chord line and a second centroid axis, the inboard section being an integral part of the fuselage at the lower wing root joint area and to the outboard section at a sections interconnection region, the wheel-type main landing gear being mounted to the inboard section adjacent to the sections interconnection region and the outboard section being connected to the inboard section at the sections interconnection region and to the upper wing at the associated interconnection region, wherein the second centroid axis is inclined relative to the first centroid axis by a relative dihedral angle that is defined in a first coordinate plane, and wherein the second quarter chord line is inclined relative to the first quarter chord line by a relative sweep angle that is defined in a second coordinate plane;

wherein the upper wing is removably attached to the upper wing root joint area by means of a hinged root joint and that the outboard section is removably attached to the inboard section at the sections interconnection region by means of a hinged joint or a clamped joint.

2. The compound rotorcraft according to claim 1, wherein the relative dihedral angle is comprised in a range between 5° and 45°, the first coordinate plane being defined by a front view plane of the compound rotorcraft.

3. The compound rotorcraft according to claim 2, wherein the relative sweep angle is comprised in a range between 5° and 45°, the second coordinate plane being defined by a top view plane of the compound rotorcraft.

4. The compound rotorcraft according to claim 1, wherein the outboard section comprises wing spars and that the fuselage is provided with wing attachment frames, the hinged joint or the clamped joint connecting the wing spars to the wing attachment frames.

5. The compound rotorcraft according to claim 1, wherein the wheel-type main landing gear is at least partly retractable into the inboard section in operation.

6. The compound rotorcraft according to claim 1, wherein the first quarter chord line is at least essentially parallel to the first coordinate plane with a maximum variance comprised in a range of ±5°.

7. The compound rotorcraft according to claim 1, wherein the inboard section exhibits a dihedral angle comprised in a range between −30° to 30°.

8. The compound rotorcraft according to claim 1, wherein the outboard section comprises a span length that is at least two to ten times longer than a span length of the inboard section.

9. The compound rotorcraft according to claim 1, wherein the lower wing root joint area and the upper wing root joint area define a transversal wing attachment basis in height direction of the fuselage and a longitudinal wing attachment basis in longitudinal direction of the fuselage, the transversal wing attachment basis being at least one to five times larger than the longitudinal wing attachment basis.

10. The compound rotorcraft according to claim 1, wherein at least one propeller is mounted to the associated interconnection region.

11. The compound rotorcraft according to claim 1, wherein the fixed wing arrangement comprises at least one pair of upper and lower wings arranged on a port side of the compound rotorcraft and at least one pair of upper and lower wings arranged on a starboard side of the compound rotorcraft, the at least one pair of upper and lower wings arranged on the starboard side of the compound rotorcraft comprising the at least one upper wing and the at least one lower wing.

* * * * *